United States Patent
Listner et al.

(10) Patent No.: US 6,656,250 B1
(45) Date of Patent: Dec. 2, 2003

(54) METHOD AND DEVICE FOR LIQUID PURIFICATION OF CRUDE GAS FLOWS

(75) Inventors: Uwe Listner, Hürth (DE); Martin Schweitzer, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/743,927

(22) PCT Filed: Jul. 5, 1999

(86) PCT No.: PCT/EP99/04653

§ 371 (c)(1),
(2), (4) Date: Mar. 12, 2001

(87) PCT Pub. No.: WO00/03788

PCT Pub. Date: Jan. 27, 2000

(30) Foreign Application Priority Data

Jul. 17, 1998 (DE) .......................................... 198 32 174

(51) Int. Cl.$^7$ ................................................ B01D 47/10
(52) U.S. Cl. ............................ 95/216; 96/275; 96/323; 261/DIG. 54
(58) Field of Search ................. 261/DIG. 54; 95/216, 95/217, 221; 96/275, 323

(56) References Cited

U.S. PATENT DOCUMENTS

| | | | |
|---|---|---|---|
| 3,207,492 A | * | 9/1965 | Zikesch |
| 3,385,030 A | * | 5/1968 | Letvin |
| 3,570,472 A | * | 3/1971 | Santangelo |
| 4,012,469 A | * | 3/1977 | Accortt |
| 4,064,202 A | * | 12/1977 | Parenchuk |
| 4,152,126 A | | 5/1979 | Strahsner et al. |
| 4,193,778 A | | 3/1980 | Strahsner et al. |
| 4,206,159 A | * | 6/1980 | Angelini et al. |
| 5,279,646 A | * | 1/1994 | Schwab |
| 5,453,258 A | | 9/1995 | Lippmann et al. |
| 5,512,085 A | | 4/1996 | Schwab |
| 5,641,124 A | | 6/1997 | Bringfors |
| 5,759,233 A | * | 6/1998 | Schwab |
| 5,826,800 A | | 10/1998 | Reither |

FOREIGN PATENT DOCUMENTS

| | | |
|---|---|---|
| DE | 4315385 | 11/1994 |
| WO | 9408700 | 4/1994 |
| WO | 9614139 | 5/1996 |

* cited by examiner

Primary Examiner—Duane S. Smith

(57) ABSTRACT

Method and apparatus for wet-cleaning crude gas streams, the method involving a flow of the crude gas stream without a pressure drop or with a low pressure drop up to 30 mbar, preferably up to 20 mbar, flowing through one or more parallel venturi throats which is/are sprayed with a scrubbing liquid via one or more periodically pulsating hybrid nozzles.

12 Claims, 10 Drawing Sheets

METHOD AND DEVICE FOR LIQUID PURIFICATION OF CRUDE GAS FLOWS

BACKGROUND OF THE INVENTION

Method and apparatus for wet-cleaning crude gas streams, the method involving the crude gas stream flowing through one venturi throat which is sprayed with a scrubbing liquid via one periodically pulsating hybrid nozzle.

To wet-clean crude gas streams, use is often made of venturi scrubbers (U.S. Pat. No. 4,152,126 and U.S. Pat. No. 4,193,778). These consist of a flow tube with a constriction, the venturi throat, and, disposed above or in the throat, a supply means for the scrubbing liquid in the form of a pressure nozzle.

Dust can thus be bound up to particle sizes of 0.1 $\mu$m. Dust removal takes place in three phases: 1. The particles impinge on the liquid surface, 2. they adhere to the liquid surface, 3. the drops of the liquid are removed.

The present invention relates to an improvement in dust removal by an improvement in phase 1. Phase 2 is unproblematic, since capture can always be assumed once the drop of liquid comes into contact with the dust grain. Phase 3 is carried out in a separate liquid separator, e.g. in a cyclone.

The collection of the grains of dust in phase 1 by the drops of liquid is effected primarily by inertial separation on high-velocity drops. The inertial separation improves with increasing relative velocity between drop and grain of dust and decreasing drop diameter.

In a venturi equipped with conventional nozzling, drops are generated which, depending on the type of nozzle (single-fluid nozzle, two-fluid nozzle or swell nozzle) and nozzle inlet pressure used, have a size range of 30–2000 $\mu$m. Close to the nozzle, these drops all have the same initial velocity which, depending on the nozzle pressure, is in the range of 3–50 m/sec. In the venturi throat, these relatively large drops are broken down into extremely fine droplets, owing to the high gas acceleration and the shear flow in the venturi throat, and are turbulated by turbulence. The droplets, now small, and the large velocity scatter of the droplets, in terms of magnitude and direction relative to the gas stream, permit many dust particles to encounter a liquid surface, leading to a high collection efficiency of dust on the liquid surface. The separation of the dust-laden liquid droplets as a condensate is then carried out in a liquid separator. The collection efficiency is measured as a ratio of the level of the constituents to be collected in the clean gas after wet cleaning and in the crude gas prior to wet cleaning.

In venturi scrubbers with conventional nozzling, the collection efficiency depends on the extent to which the drops of the scrubbing liquid are atomized in the venturi throat and are turbulated with the crude gas, so that as many dust particles as possible impinge on the liquid surfaces and are collected. The shear forces and the degree of turbulation of the crude-gas/liquid mixture in the venturi throat decreases with increasing size of the venturi throat. The size of the venturi throat and the velocity of the crude gas stream define the venturi pressure drop of the crude gas stream. The pressure drop increases as the venturi throat becomes smaller and the crude gas stream becomes larger. The collection efficiency increases with increasing venturi pressure drop.

A drawback of all known venturi scrubbers is that only a high venturi pressure drop will lead to good collection efficiency. Typical venturi scrubbers are operated from pressure drops of 20–30 mbar up to 150 mbar. A high pressure drop means high energy demands to achieve the required pumping capacity for the crude gas stream.

Another drawback is that in the event of a change in the crude gas flow rate while the venturi throat is a fixed size, the change in the velocity of the crude gas will cause a change in the venturi pressure drop. DE 43 31 301 describes a tube-gap venturi scrubber which consequently has two adjustable venturi throats. The tube-gap venturi scrubber has a tube gap of approximately rectangular cross-section. Disposed downstream behind said tube gap above the scrubber sump is a displacer which extends over the entire length of the gap and is mounted so as to be translatable towards the tube gap and away from it. Between the walls of the tube gap and the displacer wall, two venturi throats running parallel are formed. The cross-sections of these two venturi throats can be adjusted by sliding the displacer. Proposed as feeder means for the scrubbing liquid are swell nozzles.

A drawback of this solution for controlling the pressure drop is that it is subject to mechanical wear and the adjustment means must be run, in particular, through the sump below the venturi throats, which results in sealing problems.

SUMMARY OF THE INVENTION

It is an object of the invention to achieve high collection efficiencies in a venturi scrubber without pressure drops or with low pressure drops and to provide a simple option for controlling the collection efficiency. Such control is necessary, in particular, in the event of retrofitting measures which lead to a higher gas flow rate.

The object of the invention is achieved by a method and an apparatus for cleaning a crude gas stream with the aid of an atomized scrubbing liquid.

In accordance with the method according to the invention, the crude gas stream is sprayed, by means of a hybrid nozzle, with the atomized scrubbing liquid and is then passed, without a pressure drop or with a low pressure drop up to 30 mbar, preferably up to 20 mbar, through one or more venturi throats. A hybrid nozzle is known per se from DE 43 15 385.

A hybrid nozzle is constantly supplied with a scrubbing liquid and a gas as an atomization aid. The liquid inlets and gas inlets are connected to a first resonance chamber, connected to which on its downstream side, via a restrictor, there is at least one further resonance chamber. The last resonance chamber, seen in the flow direction, is connected to the outlet orifice of the hybrid nozzle.

The atomization aid used can, for example, be air or inert gas.

The hybrid nozzle can adopt both the operating mode of a pressure nozzle and the operating mode of a two-fluid nozzle. The characterizing feature of the hybrid nozzle is that, if constantly supplied with a specific amount of liquid and a specific amount of air, it will not atomize these amounts of liquid and air uniformly, but instead, in a pulsating manner, continuously change its mode of operation.

In the pressure nozzle mode, drops having a relatively large mean drop diameter are produced continuously. The mean drop diameter is essentially determined by the nozzle outlet orifice size. The effective range of a drop is determined by its initial momentum. The initial velocity of the drops is the same for all drops. Owing to their higher mass, the large drops have a higher initial momentum and consequently a higher effective range. 99% of the atomized amount of liquid is formed by drops whose diameters differ from one another by a ratio of up to 1:20.

A two-fluid nozzle differs from a pressure nozzle in that it is additionally supplied with air, continuously generating drops having a small mean drop diameter, compared with the pressure nozzle. The mean drop diameter is determined by the mass flow ratio of atomizing air to liquid in the nozzle and decreases with increasing atomizing air flow rate. The effective range of a drop is determined by the momentum of the atomizing air and the transfer of this momentum to an entire drop cluster. As with the pressure nozzle, 99% of the atomized amount of liquid are formed by drops whose diameters differ from one another by a ratio of up to 1:20.

The pulsating change in the mode of operation in the case of the hybrid nozzle can occur, depending on the pulsation frequency, between the pressure nozzle mode and a two-fluid mode or between different two-fluid modes which differ in terms of the flow rate of the atomizing air supplied.

The pulsating change in mode of operation if the supply of the hybrid nozzle with compressed air and liquid is constant over time is generated in the hybrid nozzle itself owing to periodic start-up phenomena (autopulsation).

The pulsation occurs at a frequency of preferably from 5 to 70 Hz, particularly preferably from 10 to 20 Hz. The frequency is determined by the ratio of the size of the first resonance chamber in the direction of flow, behind the point at which the liquid enters the first resonance chamber, to the size of the second resonance chamber. By changing the entry point of the liquid into the first resonance chamber it is possible to vary the volume of said resonance chamber in the flow direction and thus vary the frequency. The smaller the volume of the first resonance chamber in the flow direction in relationship to the size of the second resonance chamber, the higher the pulsation frequency will be.

The pulsating discharge from the hybrid nozzle generates a wide spectrum of drop sizes and drop velocities. Even drops of the same size may have quite different velocities, very much in contrast to the conventional nozzles. Alternately, a spray cone containing coarse drops having a large mean drop diameter and a large effective range, and a spray cone containing fine drops having a small mean drop diameter and small effective range are generated. The drop spectrum generated encompasses size ratios of drops of up to 1:1000.

The proportions of liquid and air in the discharged spray jet changes periodically, at low pulsation frequencies up to about 20 Hz, between the extreme values of 0% and 100% liquid fraction. At higher pulsation frequencies, the amplitude becomes smaller, until the liquid fraction in the range of 70 Hz only changes periodically between 45% and 55%.

Because of the pulsation, no steady-state atomization mode is established, so that the spray jet at all times locally contains start-up flows. Consequently, the size reduction of the droplets and the turbulence are achieved as early as between the scrubbing liquid feeder means and the venturi throat and not as late as in the venturi throat. Thus the venturi throat size and the venturi pressure drop, which is dependent on that size, will now have virtually no effect on the collection efficiency, and the venturi scrubber can be operated without a pressure drop in the venturi throat. The venturi throat no longer serves for size reduction and turbulation of the droplets. The spectrum generated by the hybrid nozzle in terms of the sizes, the velocities, and the shapes of the droplets leads to particularly effective dust collection in the venturi throat.

The collection efficiency in a venturi throat, given constant supply of the hybrid nozzle with liquid, can be controlled via the additionally supplied amount of compressed air in the hybrid nozzle and via the pulsation frequency.

The amount of atomizing air supplied to the hybrid nozzle for a particular amount of water is proportional to the specific energy input (atomization energy) thus induced into the hybrid nozzle. By varying the amount of atomizing air fed into the hybrid nozzle it is possible to set the energy input to a value in the range of from 0.5 kWh/1000 m$^3$ of gas to 50 kWh/1000 m$^3$ of gas, preferably from 1 kWh/1000 m$^3$ of gas to 30 kWh/1000 m$^3$ of gas.

The apparatus according to the invention consists of a flow tube in which one or more venturi throats are located and of one or more hybrid nozzles which are disposed upstream of the venturi throats. The distance between the hybrid nozzles and the venturi throat(s) can be adjustable. The distance between hybrid nozzle and venturi throats can be optimized with respect to the collection efficiency achieved.

The distance between the nozzle outlet and the center of a venturi throat located downstream can be chosen such that the area of the venturi throat situated below the hybrid nozzle is covered by the spray jet of the hybrid nozzle, preferably by 110%.

In a preferred embodiment of the apparatus according to the invention, the one or more venturi throats are formed by at least two parallel cylinders, which are juxtaposed horizontally in a plane, and in which allocated to each throat there is at least one hybrid nozzle each. Particularly preferably, the venturi throats are formed by the parallel cylinders in conjunction with one or more displacers which are disposed downstream of the parallel cylinders. The displacers can be axially movable.

A measuring system at the outlet of the mist collector downstream of the venturi for collecting the dust-laden water drops can control the compressed-air flow rate and the pulsation frequency in the hybrid nozzle as a function of the collection efficiency.

An advantage of the method according to the invention is that the collection efficiency can be controlled in a simple manner by controlling the gas flow rate and the frequency in the hybrid nozzle. The risk of the venturi scrubber becoming clogged owing to a narrow venturi gap as required for high collection efficiencies using conventional venturi scrubbers does not apply. In the hybrid nozzle itself there is likewise no risk of solids accreting, owing to the pulsation.

The amount of scrubbing liquid required is distinctly reduced, compared with the conventional systems.

Surprisingly, the collection efficiency resulting from the venturi scrubber according to the invention equipped with the hybrid nozzle is distinctly higher, in comparison, than with conventional nozzling.

The venturi scrubber according to the invention equipped with a hybrid nozzle can be used for wet dedusting of dust-laden waste gas or for removing $SO_2$ and other gaseous components from waste gases.

BRIEF DESCRIPTION OF THE DRAWINGS

The invention is described below in more detail with reference to drawings and specific embodiments.

Shown in the drawings are.

DETAILED DESCRIPTION OF THE INVENTION

Figure 1:
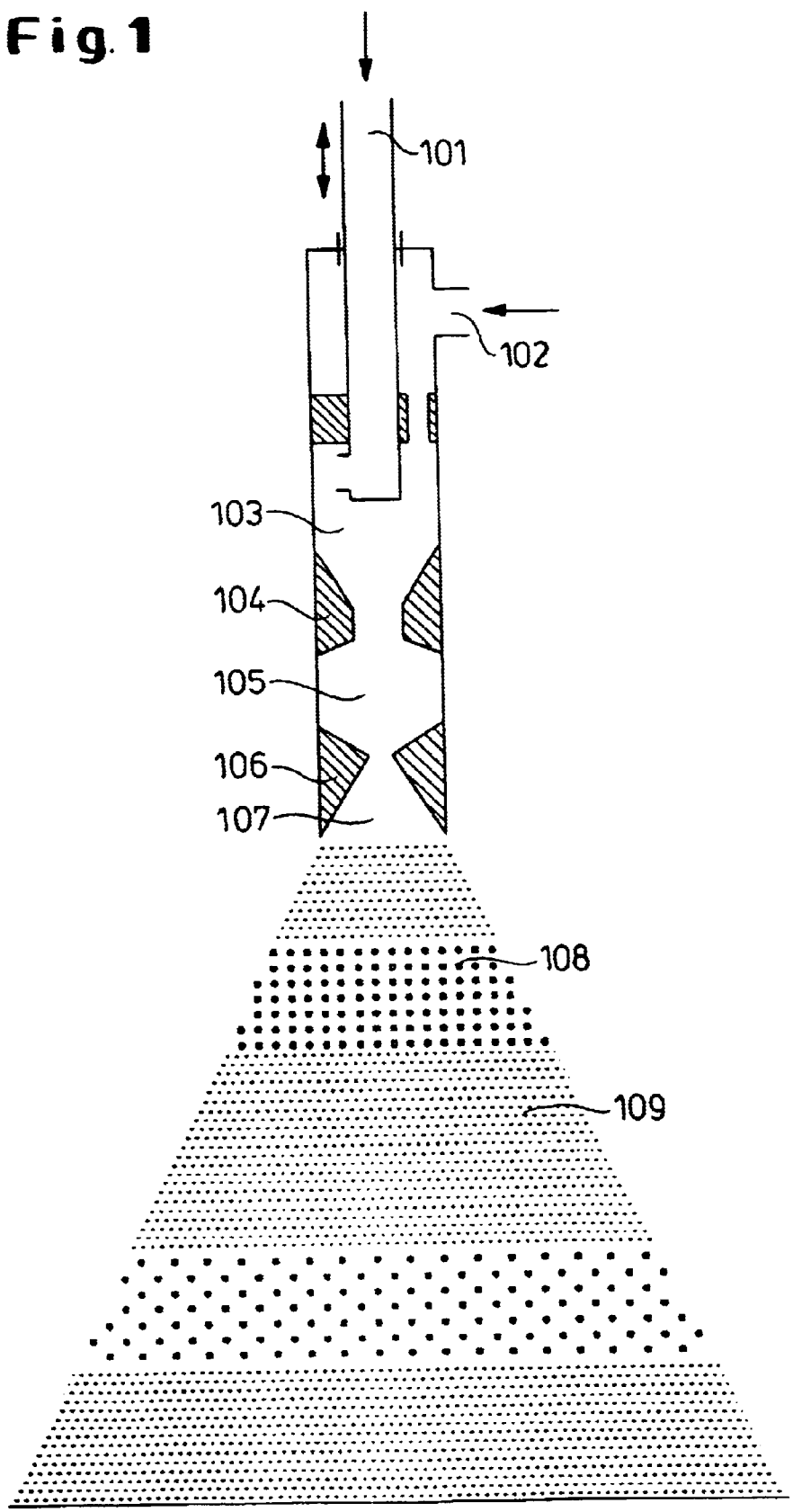
FIG. 1 Hybrid nozzle with characteristic atomization shown in schematic form.

FIG. 1 shows a hybrid nozzle. Via the liquid distribution tube 101, the hybrid nozzle is supplied with the scrubbing liquid. The liquid is introduced into the first resonance chamber 103. The first resonance chamber 103 is variable in size by virtue of the liquid distribution tube 101 which can be moved relative to the outer tube of the hybrid nozzle. The atomization aid, e.g. compressed air or steam, is fed in via the feeder 102 and is likewise passed into the resonance chamber 103. Separated by the restrictor 104, the second resonance chamber 105 is located behind the first resonance chamber 103. The second resonance chamber 105 is of fixed size. Located behind the second resonance chamber 105, and separated by the restrictor 106, is the spray head 107. Atomization using the hybrid nozzle is indicated schematically. Coarse spray 108 is generated in periodic alternation with fine spray 109.

EXAMPLE 1

Figure 2:
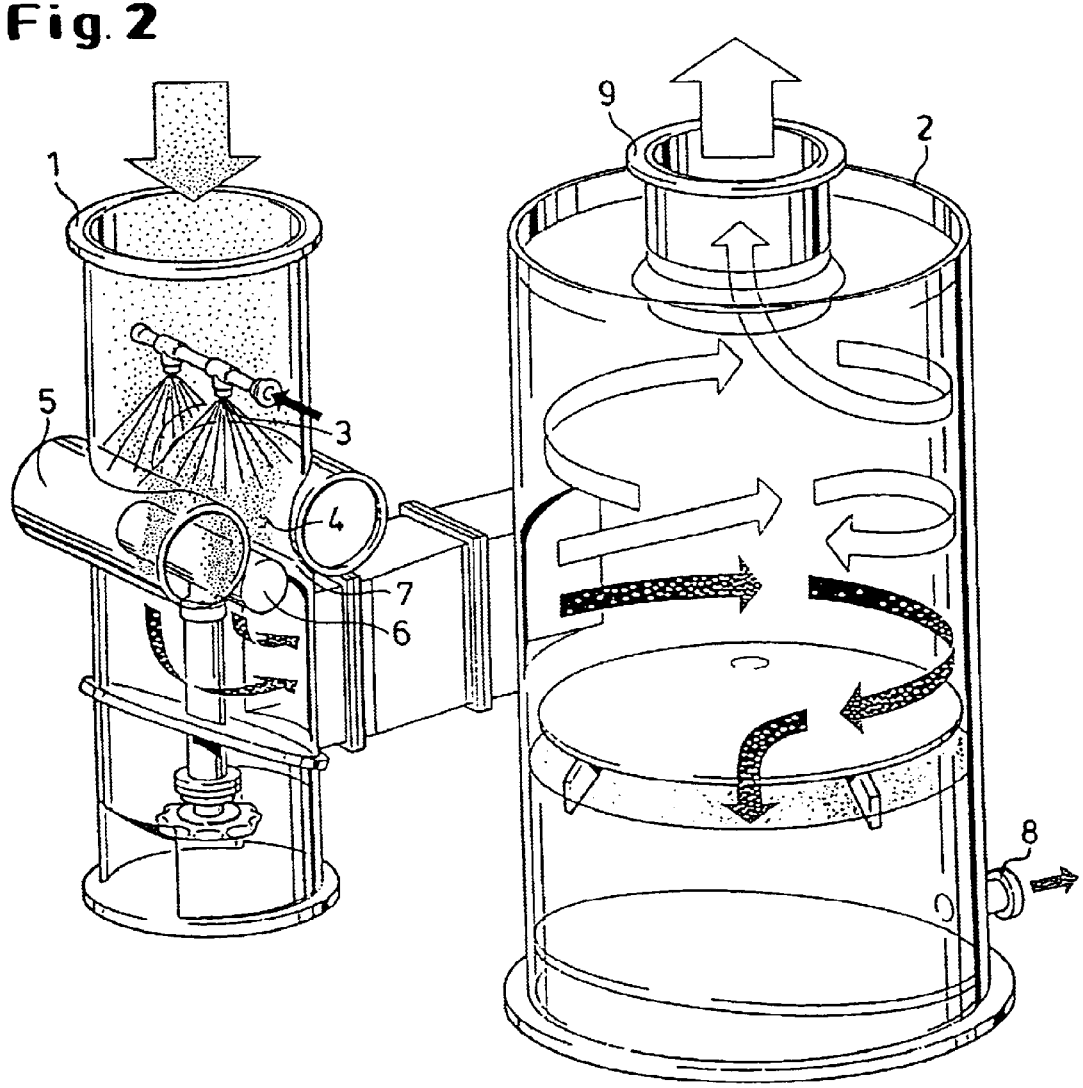
FIG. 2 Perspective view of a tube-gap venturi scrubber with downstream cyclone.

To compare the collection efficiency of a conventional venturi scrubber and a venturi scrubber according to the invention, a scrubber having two adjustable venturi throats was used which had been designed for a nominal throughput of 150 m³/h of exhaust air. FIG. 2 shows a perspective view of such a venturi scrubber 1 with a downstream cyclone for water separation 2 and conventional water nozzling 3. The roughly rectangular tube gap 4 is formed by two cylinders 5.

Disposed below the tube gap is a displacer 6 which extends over the entire gap length and is mounted so as to be translatable towards the tube gap 4 and away from it. Between the walls of the cylinders 5 and the wall of the displacer 6 the two venturi throats 7 running parallel and next to one another are formed. The clean gas, together with the water mist, leaves the venturi scrubber and arrives in the cyclone 2 where the water is separated off and discharged via the water drain 8, and the cleaned gas leaves the cyclone via the outlet 9.

Figure 3:
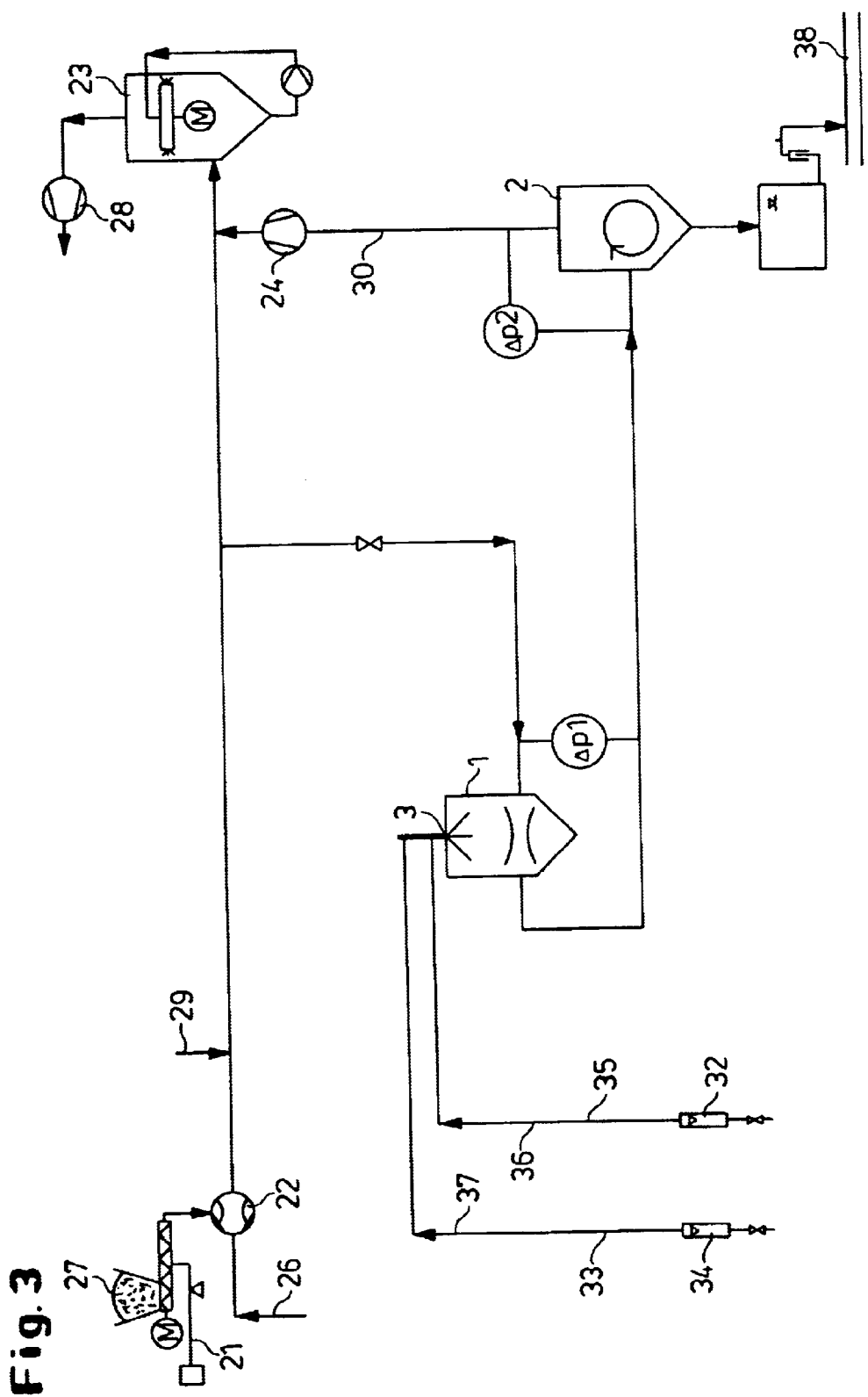
FIG. 3 Flow diagram of the test setup for wet dedusting using the venturi scrubber.

FIG. 3 shows a flow diagram of the test setup.

The fan 28 was used to draw in 2000 m³/h of room air 29. Fed into said room air was a dust-air mixture, the dust being proportioned gravimetrically, by means of a proportioning weigher 21, into an injector 22 fed with propellent air 26. The test dust 27 used was Sillitin Z 86 white (silicon dioxide) having a mean grain diameter of 1.7 μm. With the aid of the blower 24, a substream of the crude gas formed from room air and dust-air mixture was drawn off and sucked through the venturi scrubber 1 with a negative pressure of up to 100 mbar at most. In the venturi scrubber, the nozzle 3 was supplied with water through the feeder 36. The scrubbing liquid used was processed water having a salt content of 500 mg/l. Volume and pressure of the supplied water were measured by means of the instruments 32 and 35. In addition, the hybrid nozzle was supplied with compressed air from the feeder 37, pressure and volume being measured via the instruments 33 and 34. The venturi pressure drop was determined using the instrument $\Delta p_1$, and the pressure drop in the cyclone was determined using the instrument $\Delta p_2$.

In the cyclone 2, the scrubbing liquid, together with the collected dust, was directed into the waste water duct 38, and the cleaned gas, together with the crude gas, was fed into the in-house exhaust air system via the single-stage rotary scrubber 23.

The continuous measurement of the clean-gas dust content was carried out by using a scattered-light photometer 30 from Sigrist, at the outlet of the cyclone.

Figure 4:
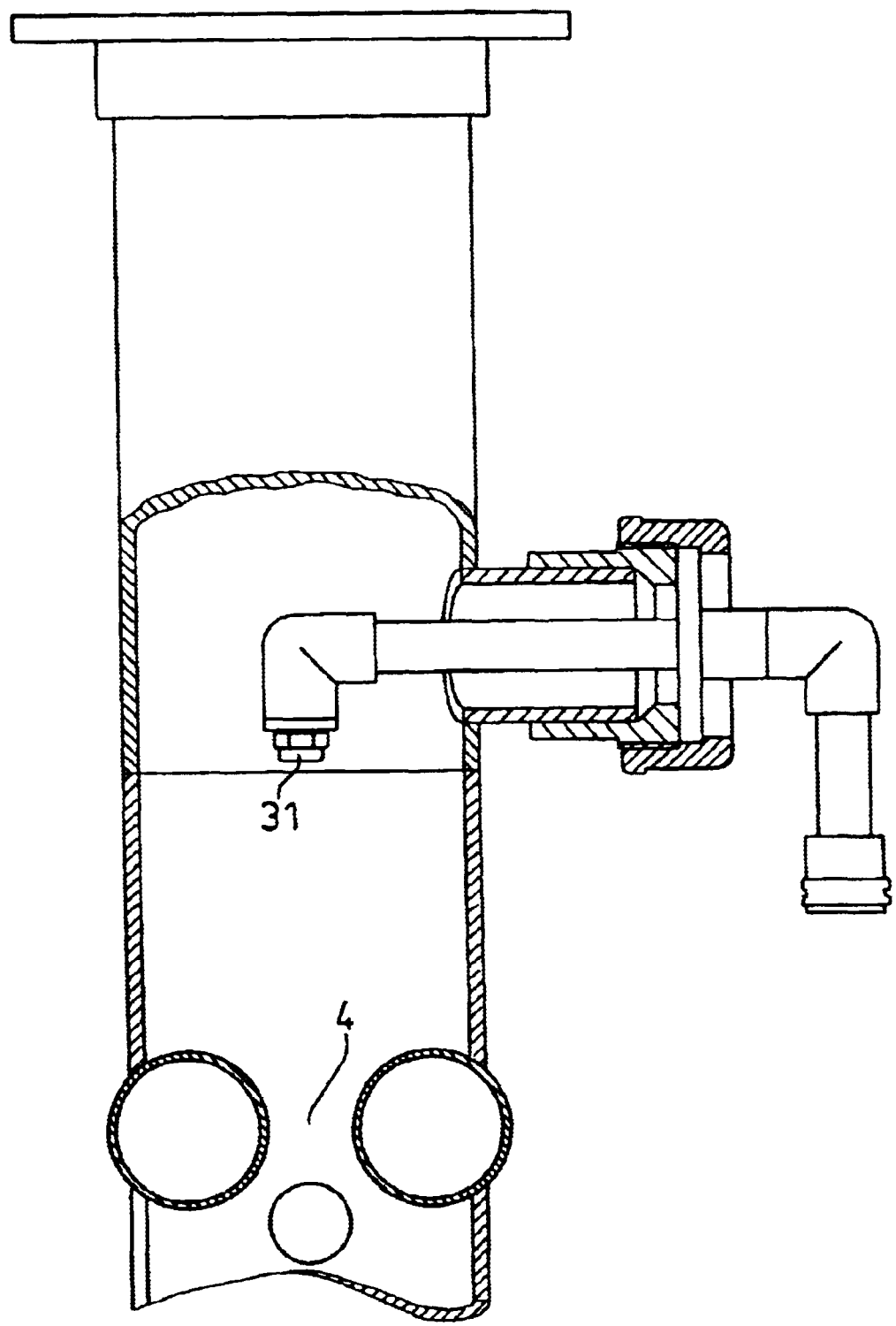
FIG. 4 Detail of the flow tube of a tube-gap venturi scrubber equipped with conventional pressure nozzle.

FIG. 4 shows a detail of the flow tube of a tube-gap venturi scrubber equipped with a conventional pressure nozzle (No. 460.683 from Lechler) 31, which is disposed above the tube gap 4. The pressure nozzle has a solid-cone spray pattern with a spray angle of 45°. The position in the inflow tube was chosen so as to wet the entire tube cross-section within the tube gap area. The throughput capacity of the nozzle at a pressure drop of 3 bar was 353 l/h of water. The mean drop diameter in the spray of this pressure nozzle w as 270 μm for a water throughput of 280 l/h.

Figure 5:
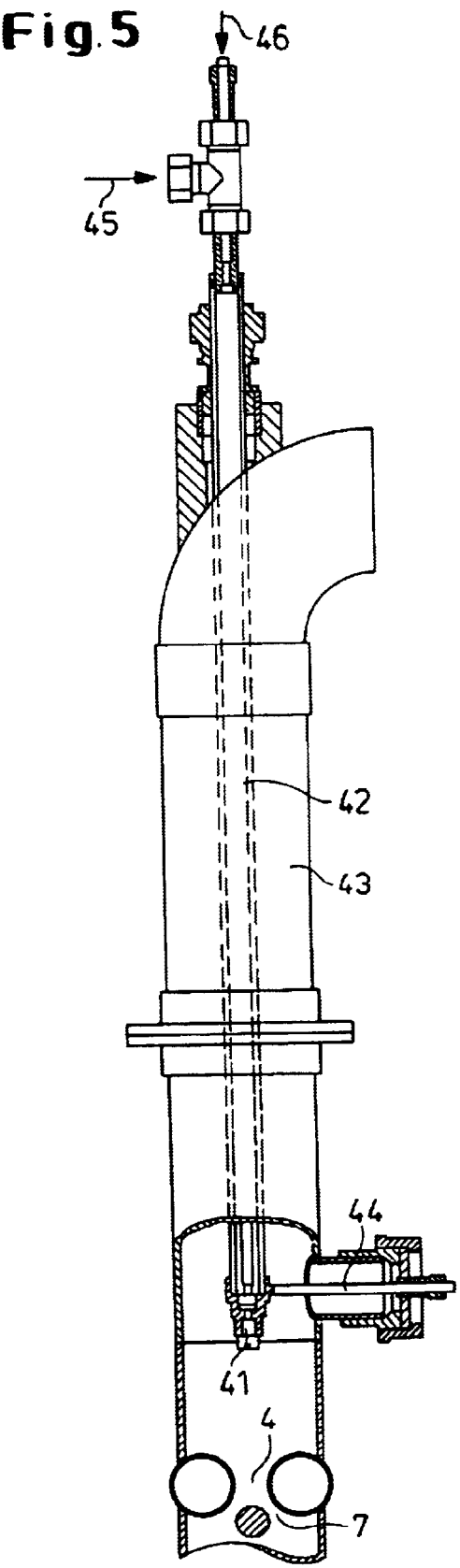
FIG. 5 Detail of the flow tube of a tube-gap venturi scrubber equipped with hybrid nozzle.

FIG. 5 shows a detail of the flow tube 43 of a tube-gap venturi scrubber equipped with a hybrid nozzle 41 which is disposed above the tube gap 4. The hybrid nozzle 41 sits on an atomization lance 42, central axially in the flow tube 43. The distance from the tube gap can be varied, and the position of the nozzle with respect to the tube walls of the flow tube can be adjusted by means of a centring rod 44. The compressed air can be delivered via the port 45, and the liquid can be delivered via the port 46. The hybrid nozzle generates a fan spray pattern in the form of a narrow rectangle. The spray angle between the long sides of the rectangle is 18° and between the short sides, depending on the nozzle used, between 40 and 160°, the best collection efficiency being achieved at 160°. The distance to the tube gap was set so as to achieve a coverage of 110% of the gap by the spray jet.

Figure 6:
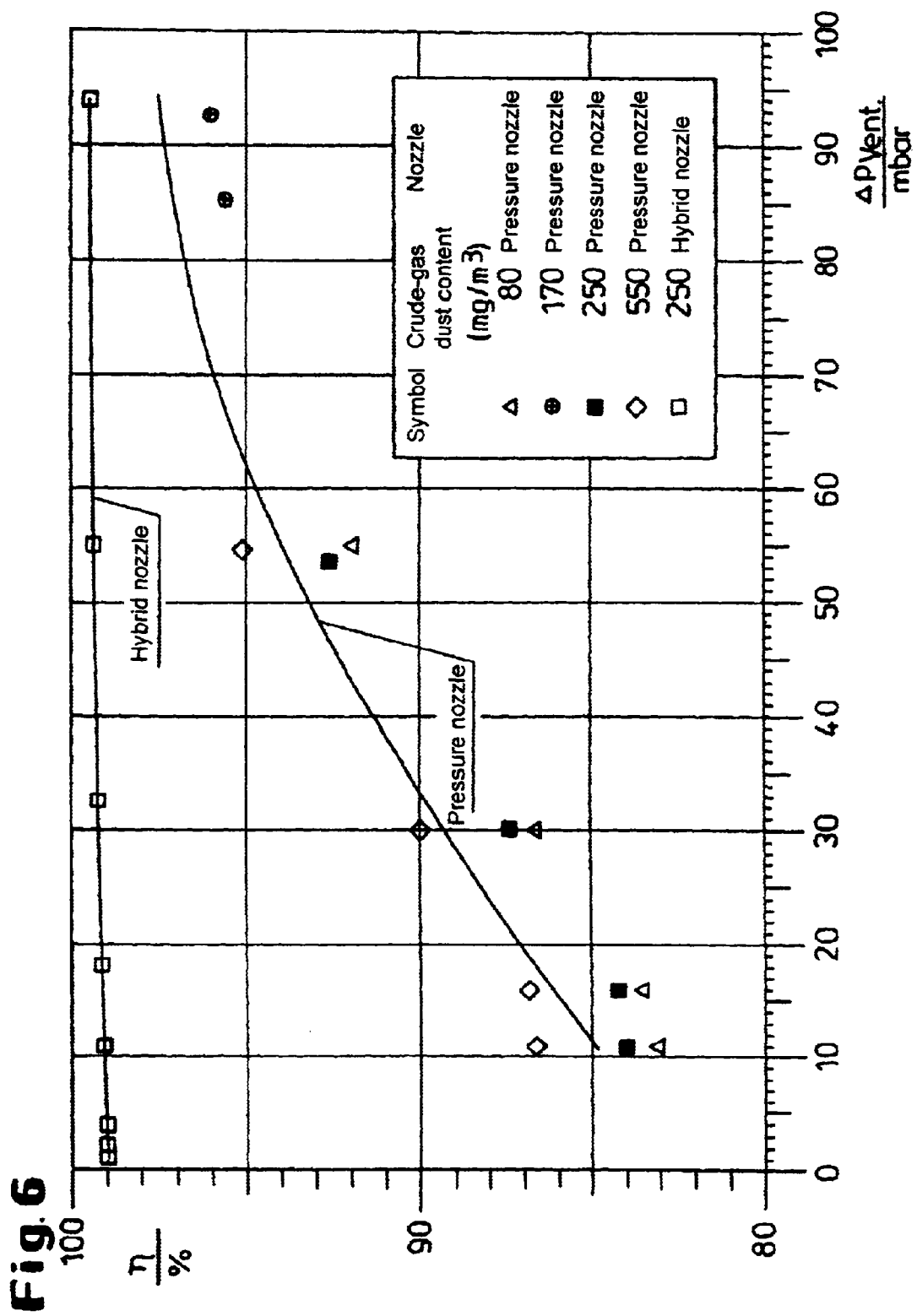
FIG. 6 Dependence of the dust collection efficiency on the pressure drop in the venturi scrubber for pressure nozzle and hybrid nozzle.

FIG. 6 shows the measured dependence of the dust collection efficiency η, in %, on the pressure drop in the venturi $\Delta p_{venturi}$ and on the crude gas dust content for a crude-gas throughput of 100 m³/h, a water throughput at the pressure nozzle of $v_{WD}$=280 l/h and a water throughput at the hybrid nozzle of $v_{WZ}$=150 l/h. The collection efficiency using the pressure nozzle increases markedly with increasing venturi pressure drop, whereas the collection efficiency using the hybrid nozzle depends only slightly on the venturi pressure drop.

The absolute collection rates for a crude-gas dust content of 250 mg/m³ are 84% for the pressure nozzle at a venturi pressure drop of 11 mbar, and 92.5% at a pressure drop of 54 mbar.

Given the same crude-gas dust content, the hybrid nozzle achieves a collection efficiency of 99 to 99.5% over the entire pressure drop range from 1 to 93 mbar. At the same time, the water flow rate required with the pressure nozzle, at 280 l/h, is almost twice the water flow rate of 150 l/h required with the hybrid nozzle.

For higher crude-gas dust contents of e.g. 550 mg/m³ the collection rates using the pressure nozzle are somewhat higher overall, but fall a long way short of the collection efficiency achieved using the hybrid nozzle.

Figure 7:
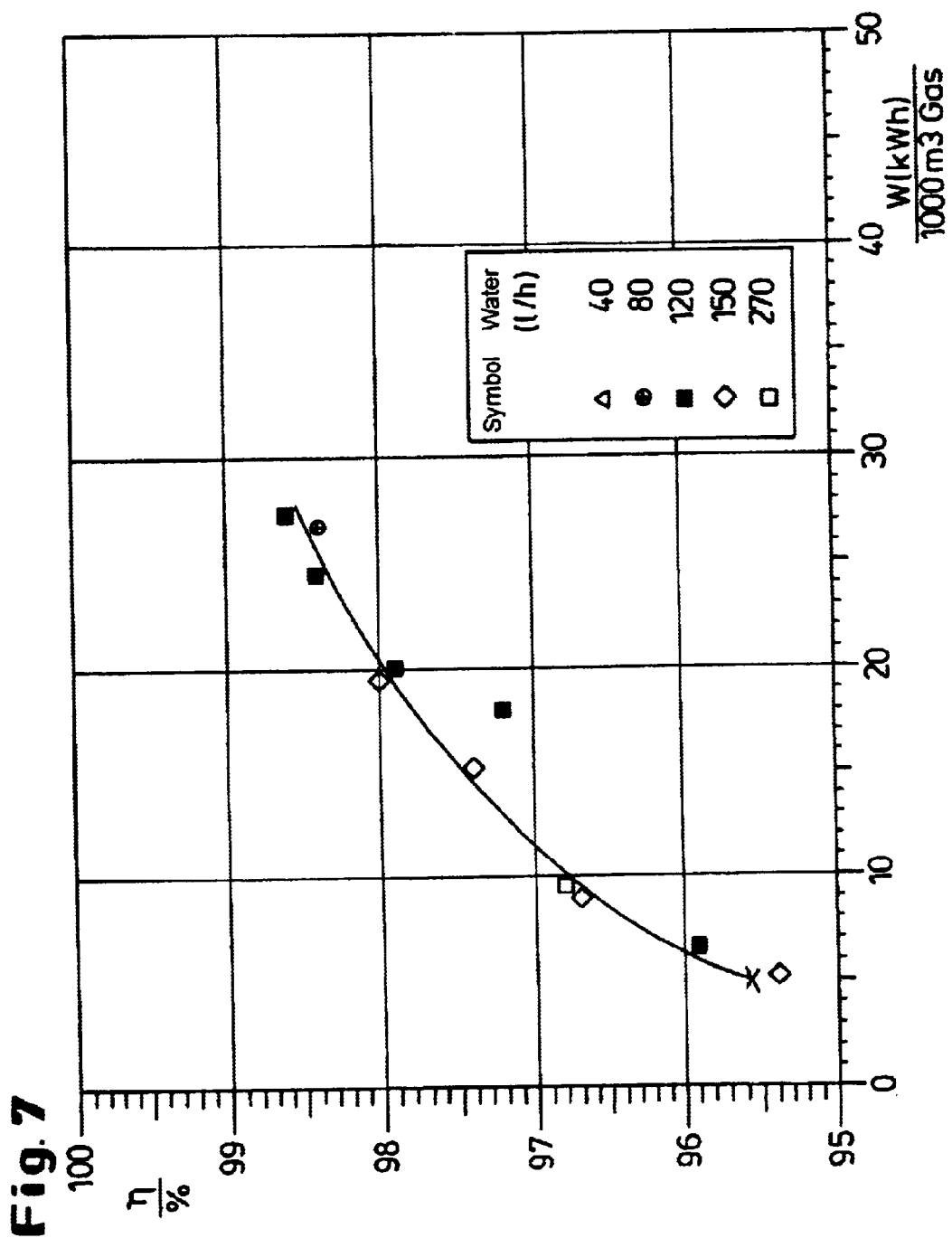
FIG. 7 Dependence of the dust collection efficiency on the atomization energy in the venturi scrubber equipped with hybrid nozzle.

FIG. 7 shows how the collection rate using the hybrid nozzle, if fed a specific amount of water (40, 80, 120, 150, 270 l/h), increases with increasing energy input W via the atomizing air. The collection rate can thus be controlled via the atomizing air flow rate, which is proportional to the energy input. The pressure drop in the venturi was 0 mbar, i.e. the venturi gap was wide open. The gas throughput through the venturi in the experiment shown was 120 m$^3$/h, which resulted in slightly lower collection efficiencies than in FIG. 6. The dust content in the crude gas was 250 mg/m$^3$ as in FIG. 6.

EXAMPLE 2

Figure 8:
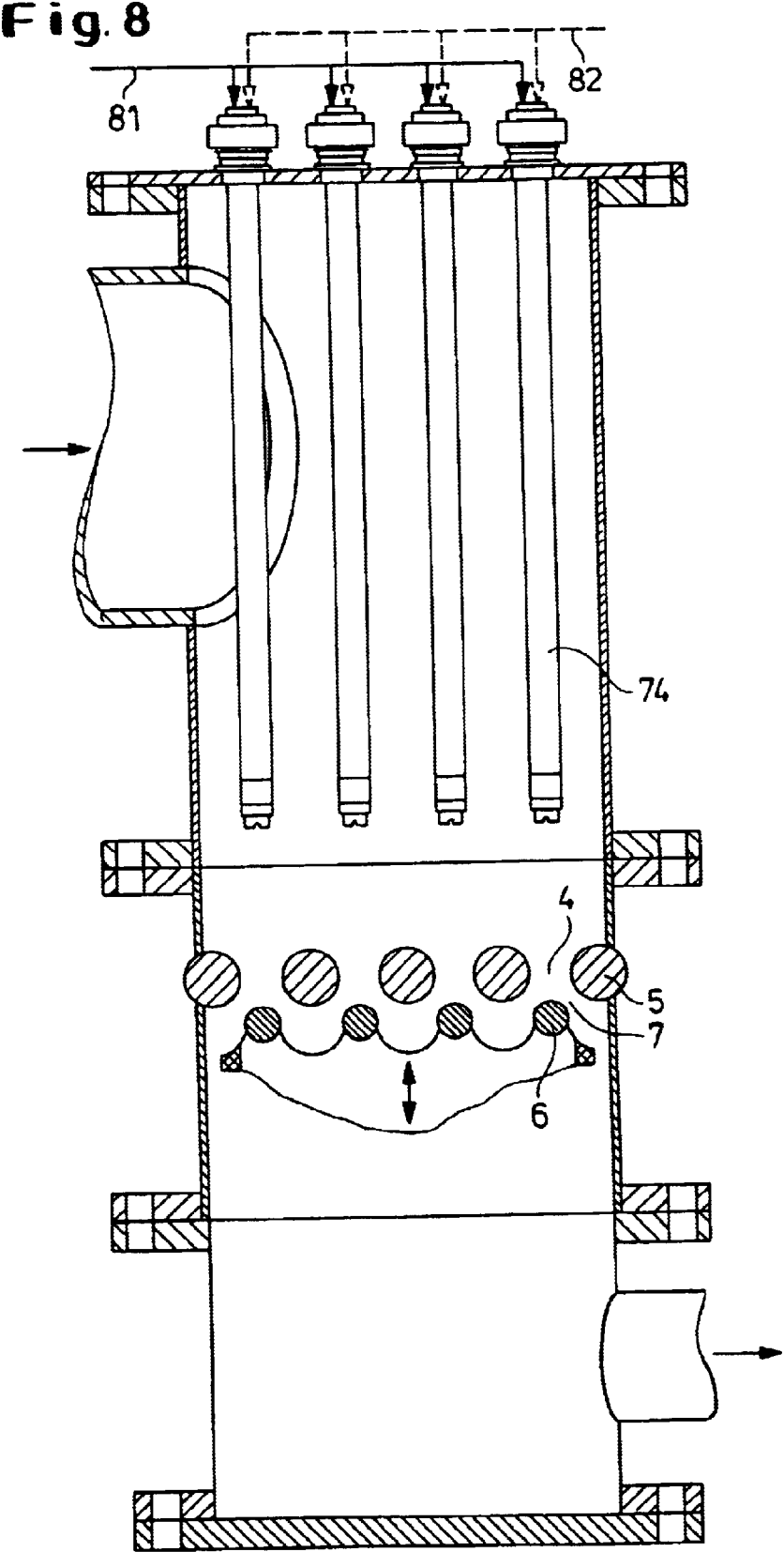
FIG. 8 Tube-gap venturi scrubber having eight venturi throats.

Integrated into the experimental setup depicted in FIG. 3 is a different tube-gap venturi scrubber which is designed for a gas throughput of about 1000 m$^3$/h and has eight venturi throats, instead of the venturi scrubber from Example 1. This other scrubber is depicted in FIG. 8. On the inflow side it has four tube gaps 4 (primary gaps) which are formed by five cylindrical bodies 5. Disposed below the primary gaps are four displacers 6, so that eight venturi gaps 7 are formed. The displacers are mounted on a tube which is axially translatable by means of a threaded rod (not shown). Thus it is possible for the eight, in total, venturi gaps to be changed in size and the pressure drop of the venturi scrubber thus to be adjusted. Above the primary gaps, four hybrid nozzles 74 are located which can be operated in pressure mode (with liquid only) or as hybrid nozzles. Via the feeders 81 the nozzles are supplied with the scrubbing liquid, and via the feeders 82 the hybrid nozzles are supplied with the pressurized air if required. The nozzles have a fan-shaped spray pattern and completely cover with the spray the respective primary gaps situated underneath. The maximum adjustable pressure drop via the change in size of the venturi throats is 23 mbar in this venturi scrubber.

Figure 9:
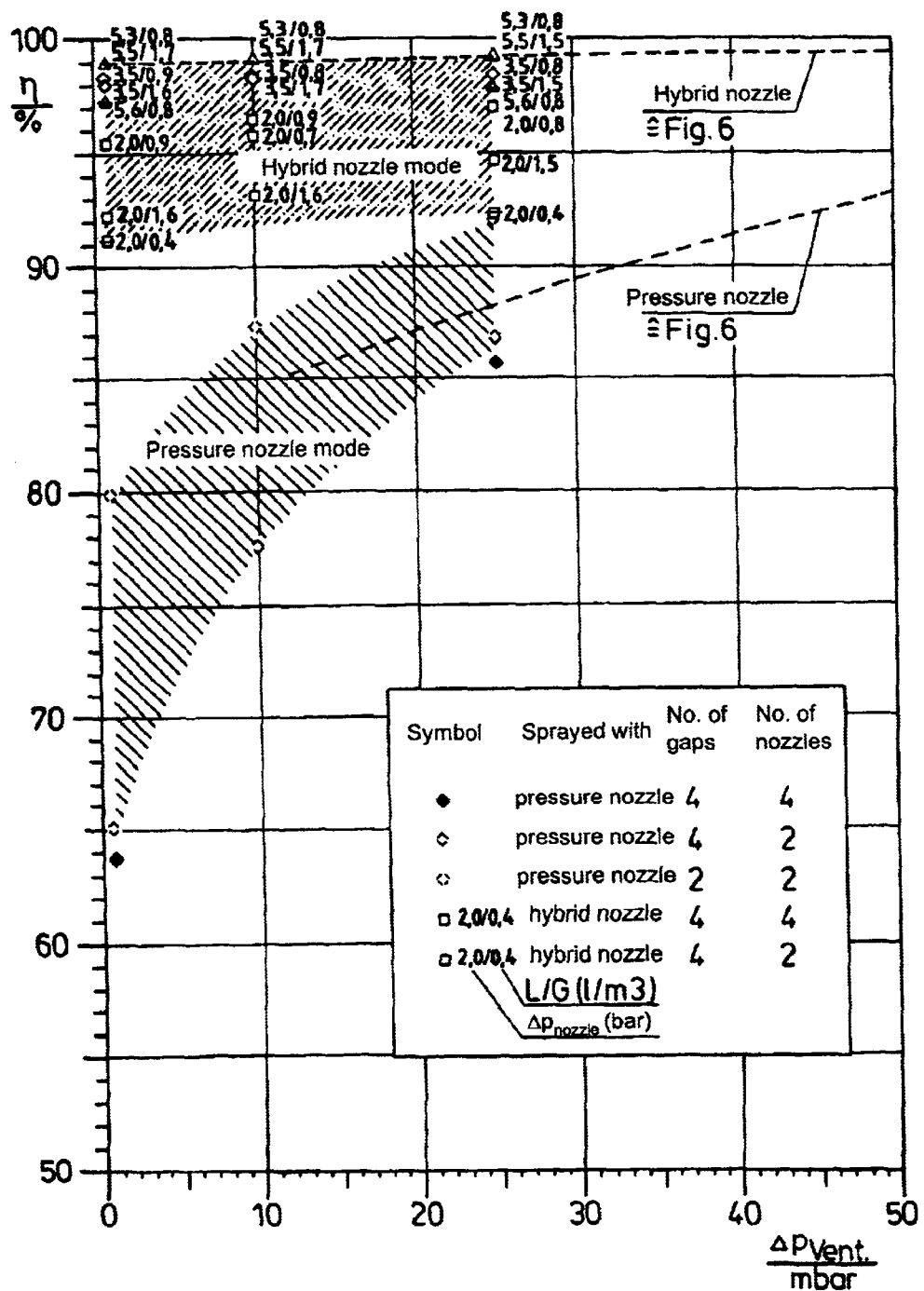
FIG. 9 Dependence of the dust collection efficiency on the pressure drop in the venturi scrubber for pressure nozzle and hybrid nozzle with the scrubber having eight venturi throats.

FIG. 9 shows a plot of the measured results, as collection efficiency η in %, against the venturi pressure drop which were achieved in pressure nozzle mode and in hybrid nozzle mode using the venturi scrubber depicted in FIG. 8. The crude gas was laden with 380 mg/m$^3$ of dust. The crude gas streams were from 900 m$^3$/h to 1100 m$^3$/h. In addition, for comparison, the results achieved with the venturi scrubber from Example 1 are plotted as dashed lines.

The same behaviour manifests itself in FIG. 9 as in the experiments using the venturi scrubber from Example 1. The collection rates in pressure nozzle mode (hatched area) markedly increase with increasing venturi pressure drop. This dependence is independent of the number of nozzles and tube gaps used. The highest collection rates were achieved when two nozzles and two gaps at the highest possible venturi pressure drop were used, and were 92.2%. In so doing, the ratio of atomized liquid (L) to the amount of crude gas (G) L/G=2.9 l/m$^3$. This means that a crude gas laden with 380 mg/m$^3$ could be cleaned to a level of 30 mg/m$^3$ with a venturi pressure drop of 23 mbar. The water flow rate used in the process in the two nozzles was 2900 l/h with a crude-gas throughput of 1000 m$^3$/h.

In the hybrid nozzle mode the venturi scrubber was operated using four nozzles and two or four tube gaps, varying the ratio of atomized liquid (L) to the amount of crude gas (G) and for various pressure drops at the nozzles.

What is demonstrated in FIG. 9, as indeed earlier in FIG. 6, is that the collection rate in hybrid nozzle mode is virtually independent of the venturi pressure drop and overall is distinctly higher than in pressure nozzle mode. The measurements merge seamlessly with the measurements carried out in Example 1, which are shown as dashed line at η=99%.

Furthermore, the results show that the collection rate at the nozzle in hybrid nozzle mode increases with increasing nozzle pressure $\Delta p_{nozzle}$. The nozzle pressure was set to the values 2 bar, 3.5 bar, 5.3 bar, 5.5 bar and 5.6 bar. The L/G ratio was varied between 0.4 and 1.7 l/m$^3$ and thus was at all times below the L/G=2.9 l/m$^3$ in pressure nozzle mode.

Using the hybrid nozzles, it was possible to clean a crude gas laden with 380 mg/m$^3$, at a nozzle inlet pressure of 5.3 bar, with L/G=0.8 l/m$^3$ and without a venturi pressure drop, to a level of 3.8 mg/m$^3$. In the process, a total amount of water of 800 l/h was consumed in the four nozzles, with a crude-gas throughput of 1000 m$^3$/h.

EXAMPLE 3

The tube-gap venturi scrubber was used to strip waste gas of $SO_2$.

Figure 10:
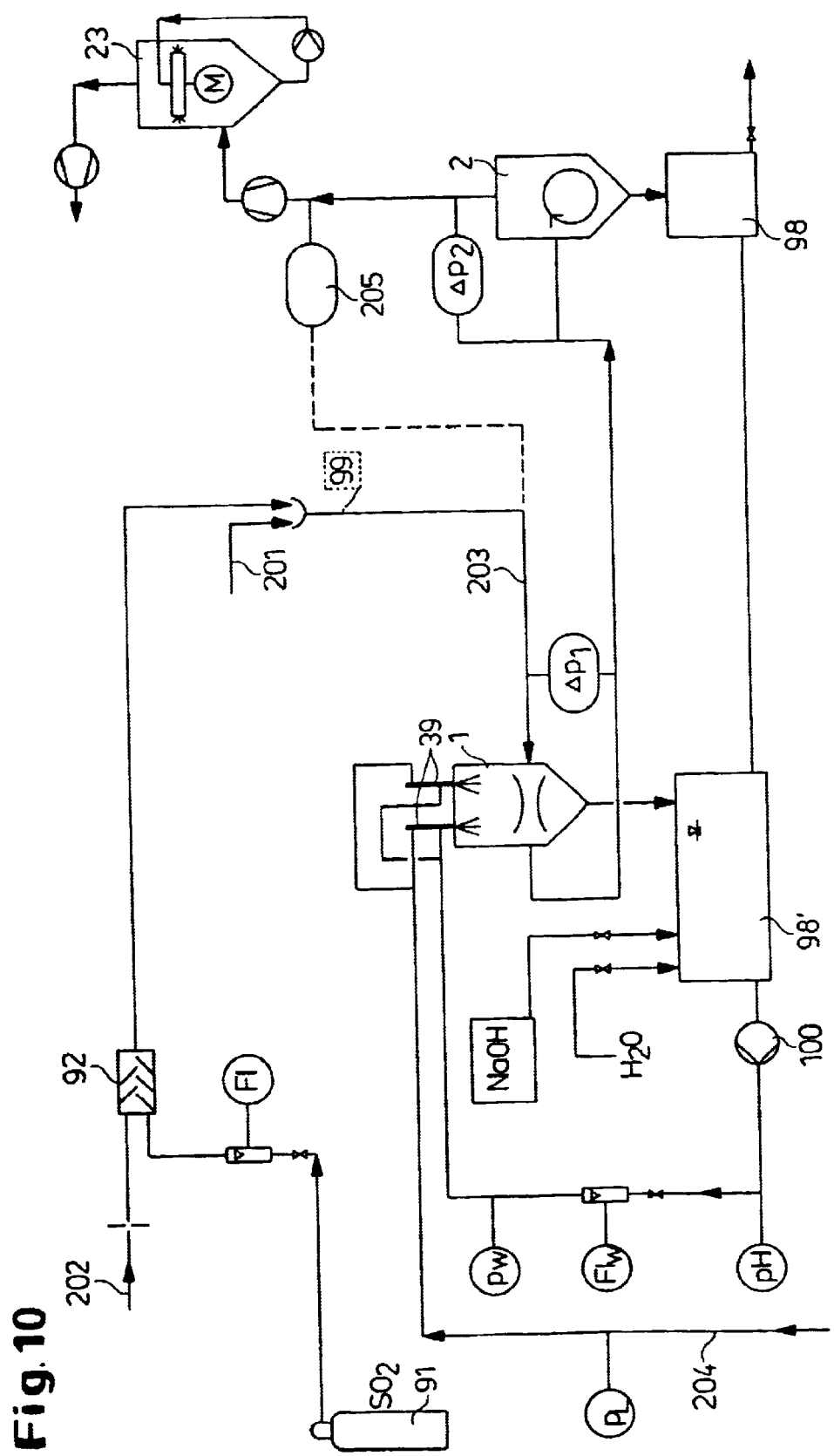
FIG. 10 Flow diagram of the test setup for $SO_2$ absorption using the venturi scrubber.

FIG. 10 shows the flow diagram of a pilot plant equipped with the tube-gap venturi 1 from Example 2, designed for 1000 m$^3$/h of exhaust air. Flowing through the venturi scrubber 1 is a synthetic exhaust air (SEA) consisting of room air, 20 1, and $SO_2$-containing mixed air.

In a static mixer 92, the mixed air 202 from the compressed-air grid is admixed with $SO_2$ from a compressed-gas cylinder 91. The volumetric flow rate of the $SO_2$ is indicated by a rotameter F1. The $SO_2$-containing mixed air, at atmospheric pressure, flows into the feeder 99 of the venturi scrubber and, until it enters the scrubber, mixes in the line 203 with the room air. Room air and $SO_2$-containing mixed air form the synthetic exhaust air (SEA). The SEA throughput and the $SO_2$ concentration are determined, if required, by means of a Prandtl tube and IR measuring instrument (URAS 3E, from Hartmann und Braun) 205. The volumetric flow rate measurement is carried out in accordance with the criteria defined in DIN 2066.

From the scrubber sump 98', the absorption solution is delivered to the atomizing nozzles 39 in the venturi scrubber head by means of a speed-controlled pump 100. Volumetric flow rate, pH and pressure are measured continuously using the instruments pH, F1$_w$ and p$_w$. If necessary, the pH is maintained within a range beneficial to the absorption by the addition of aqueous NaOH. To supply the nozzles with air, compressed air at the pressure $P_L$ is delivered via feeder 204.

After the $SO_2$-containing room air has been sprayed in the venturi scrubber 1, the collected liquid drops arrive in the absorber sump 98'. The liquid collected in the cyclone 2 also arrives in the absorber sump 98 which communicates with the absorber sump 98'. The cleaned gas is fed to a single-stage rotary scrubber 23 before being discharged into the atmosphere via the in-house exhaust air system.

The venturi pressure drop was determined by means of the measuring instrument $\Delta p_1$, and the pressure drop at the cyclone was determined by means of the measuring instrument $\Delta p_2$.

The venturi scrubber 1 used was the scrubber shown in FIG. 8, the two outer gaps, close to the tube wall, being covered. The two tube gaps close to the axis were sprayed either by means of all four nozzles or by means of the two nozzles installed above the primary gaps close to the axis. The nozzles used were the hybrid nozzles and, for comparison, commercial two-fluid nozzles (from Lechler, series KSD, size 1×150.008 and 1×150.013).

In the two-fluid nozzles, atomization takes place in two phases. The liquid supplied is first atomized centrally by means of a pressure nozzle, forming a hollow cone with a spray angle of 100°. The atomizing air emerging with an angular momentum from an annular gap disposed close to the pressure nozzle preferentially disrupts the larger of the drops generated by means of pressure atomization. If instead of atomizing air water is directed via the annular gap, eight spray jets rise from the annular gap, corresponding to the generation of angular momentum by the slots. Each individual jet in its core consists of drops up to 1 mm in size and is surrounded by a cloud of smaller drops. The angle between two spray jets emerging on opposite sides is 40°. Given an identical pressure drop at the nozzle, this results in a ratio of centrally atomized water to sprayed annular-gap water of 1:4.5.

The $SO_2$ concentration of the crude gas, prior to entering the venturi scrubber, was either 100 mg/m$^3$ or 500 mg/m$^3$. The total throughput through the absorber was 1000 m$^3$/h.

The hybrid nozzle, for both $SO_2$ concentrations at a nozzle pressure of 5.5 bar and a ratio of atomized liquid to the crude gas flow rate of L/G=0.9 l/m$^3$ and without a pressure drop in the venturi scrubber, achieved a collection efficiency of 99%. The conventional two-fluid nozzle, with the same parameters and at an $SO_2$ concentration in the crude gas of 100 mg/m$^3$, achieved a collection efficiency of 95.5%.

At pressure drops in the venturi scrubber of up to 23 mbar, the collection efficiency using the hybrid nozzle remained constant. Using the two-fluid nozzle it fluctuated between 95.5% and 93%.

What is claimed is:

1. A method for cleaning a crude gas stream with the aid of an atomized scrubbing liquid, comprising the following steps: a) spraying a crude gas stream with an atomized scrubbing liquid, by means of at least one hybrid nozzle which operates to eject the atomized scrubbing liquid in alternating pulses of relatively coarse and relatively fine droplets, and then b) passing the resulting stream of gas plus atomized scrubbing liquid, without a pressure drop or with a low pressure drop, through at least one venturi throat.

2. The method according to claim 1, wherein the pressure drop of the crude gas stream, as it flows through said at least one venturi throat, is at most 30 mbar.

3. The method according to claim 1 or 2, wherein said hybrid nozzle is operated at a pulsation frequency of from 5 to 70 Hz.

4. Apparatus for cleaning crude gas with the aid of an atomized scrubbing liquid, comprising a flow tube, one or more venturi throats located in said flow tube, and at least one hybrid nozzle which operates to eject the atomized scrubbing liquid in alternating pulses of relatively coarse and relatively fine droplets, disposed within said flow tube upstream of said venturi throats.

5. The apparatus according to claim 4, wherein said hybrid nozzle comprises a first resonance chamber having inlets for scrubbing liquid and gaseous atomization aid, a second resonance chamber following said first resonance chamber and in fluid communication therewith, a first restrictor located between and separating said first and second resonance chambers, a spray head following said second resonance chamber and in fluid communication therewith, and a second restrictor located between and separating said second resonance chamber and said spray head.

6. The apparatus according to claim 4 or 5, wherein the entry point for liquid into the first resonance chamber of said hybrid nozzle is variably adjustable.

7. The apparatus according to claim 4, wherein said hybrid nozzle is adjustable in terms of its distance from said venturi throats.

8. The apparatus according to claim 4, wherein said one or more venturi throats are formed by at least two parallel cylinders, and are juxtaposed horizontally in a plane, and allocated to each venturi throat there is at least one hybrid nozzle.

9. The apparatus according to claim 4, wherein said venturi throats are formed by parallel cylinders in conjunction with one or more displacers which are disposed downstream of the parallel cylinders.

10. The apparatus according to claim 9, wherein said displacer(s) are axially movable.

11. The method of claim 2 wherein said pressure drop is at most 20 mbar.

12. The method of claim 3 wherein said hybrid nozzle operates at a pulsation frequency of from 10 to 20 Hz.

* * * * *